United States Patent [19]

Warburton

[11] 4,203,286
[45] May 20, 1980

[54] COOLING APPARATUS FOR AN EXHAUST NOZZLE OF A GAS TURBINE ENGINE

[75] Inventor: Robert E. Warburton, Lake Park, Fla.

[73] Assignee: The United States of America as represented by the Secretary of the Air Force, Washington, D.C.

[21] Appl. No.: 956,305

[22] Filed: Oct. 30, 1978

Related U.S. Application Data

[63] Continuation-in-part of Ser. No. 718,271, Aug. 27, 1976, abandoned.

[51] Int. Cl.² ............................................. F02K 1/12
[52] U.S. Cl. ..................................... 60/266; 60/271; 239/265.17; 239/265.39
[58] Field of Search .................................. 60/266, 271; 239/265.17, 265.37, 265.39, 265.41

[56] References Cited

U.S. PATENT DOCUMENTS

| 3,214,905 | 11/1965 | Beavers et al. | 239/265.17 |
|---|---|---|---|
| 3,972,475 | 8/1976 | Nelson et al. | 239/265.41 |
| 3,979,065 | 9/1976 | Madden | 239/265.39 |
| 4,000,612 | 1/1977 | Wakeman et al. | 60/266 |
| 4,043,509 | 8/1977 | McHugh et al. | 239/265.41 |
| 4,074,523 | 2/1978 | Holler et al. | 60/266 |
| 4,081,137 | 3/1978 | Sutton et al. | 239/265.39 |

*Primary Examiner*—Robert E. Garrett
*Attorney, Agent, or Firm*—Joseph E. Rusz; William Stepanishen

[57] ABSTRACT

A cooling control system for a convergent-divergent gas turbine exhaust nozzle which permits automatic ducting of cooling air during the augmented mode of engine operation. The convergent flaps of the nozzle have longitudinal ducts embedded therein with a pair of openings near the aft extreme of each of the convergent flaps and openings located in the forward half of the convergent flaps. The convergent seals overlap the convergent flaps and are slideably mounted for positioning over the aft openings on the flaps. A positive pressure is generated under the convergent flap liner and seal liner when the convergent seal is opened to allow cooling air to be ducted through the flap. The positive pressure forces the convergent flap and seal liners up toward the center line of the nozzle.

7 Claims, 8 Drawing Figures

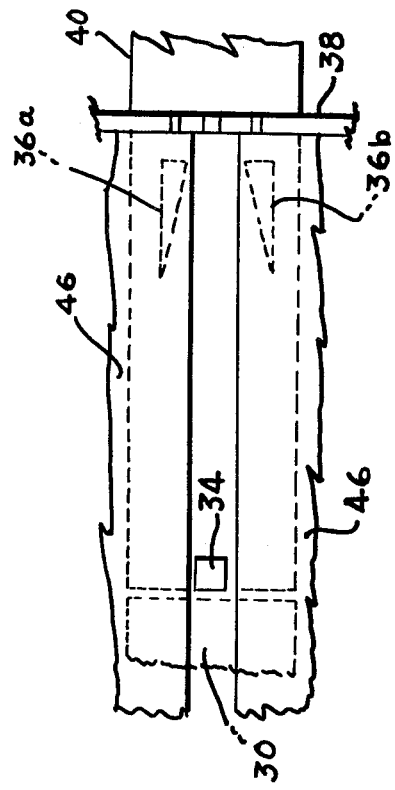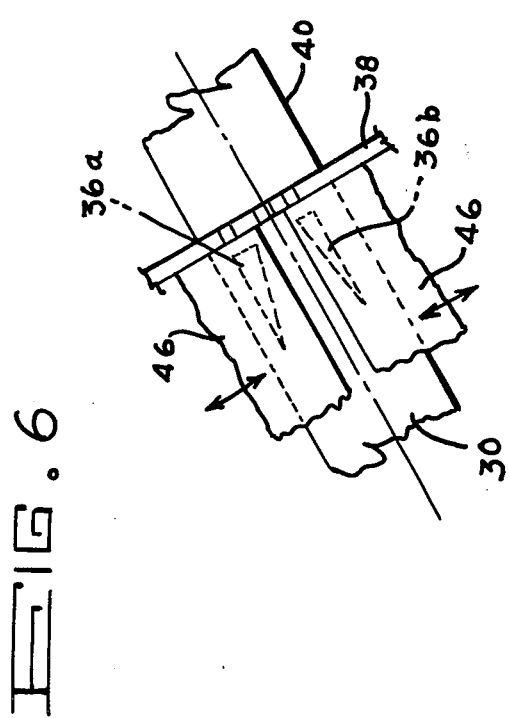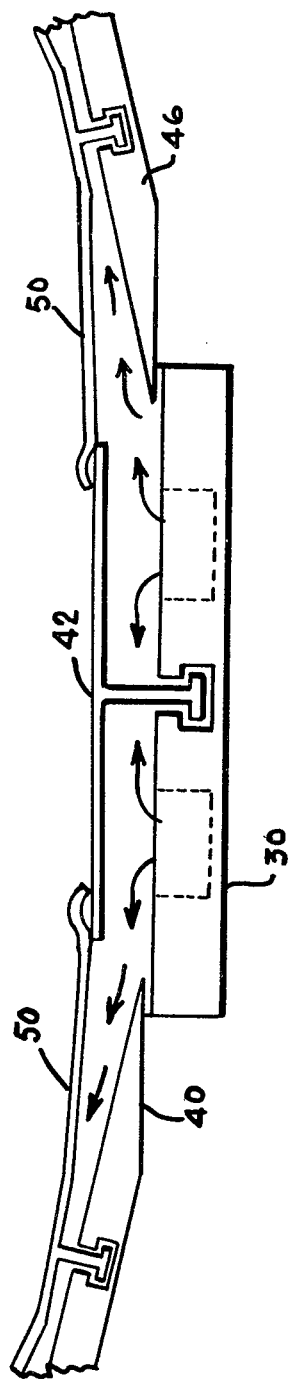

4,203,286

COOLING APPARATUS FOR AN EXHAUST NOZZLE OF A GAS TURBINE ENGINE

STATEMENT OF GOVERNMENT INTEREST

The invention described herein may be manufactured and used by or for the Government for governmental purposes without the payment of any royalty thereon.

CROSS-REFERENCE TO RELATED APPLICATION

This patent application is a continuation-in-part of co-pending patent application, Ser. No. 718,271, now abondoned, titled: "Cooling Air Nozzle For An Exhaust Nozzle Of A Gas Turbine Engine", filed Aug. 27, 1976 in the name of Robert E. Warburton.

BACKGROUND OF THE INVENTION

This invention relates to adjustable gas turbine exhaust nozzle for augmented turbo fan engines, and more particularly to the cooling of the nozzle convergent and divergent flaps and seals. In exhaust nozzles for augmented turbofan engines there is a variation of the nozzle cooling requirement depending on whether the engine is being operated in the augmented mode, partially augmented mode, or the nonaugmented mode.

The present invention automatically adjusts the air flow through the convergent flaps so that the required cooling is provided to the nozzle during all modes of nozzle operation. This adjustment is accomplished as a function of nozzle postiion and also as a function of the shape of the aft openings to the convergent flap.

SUMMARY OF THE INVENTION

The invention disclosed herein is a system for cooling the convergent and divergent flaps and seals of a convergent-divergent exhaust nozzle using flap and seal liners, convergent seal, and air channels embedded in the convergent flap. Openings located in the forward surface of the convergent flaps allow entry of air into the flaps and a pair of openings at the aft extreme permits the exit of air from the embedded channels or ducts. The pressure of the air when the convergent seals are opened raises the convergent flap and seal liners; when the engine is operated in the nonaugmented mode, the convergent seals slide over the aft openings to prevent the flow of cooling air through the convergent flaps.

It is therefore an object of the invention to provide an improved cooling system for a convergent-divergent exhaust nozzle.

It is another object to provide a cooling system for an exhaust nozzle that allows the cooling air flow to be automatically adjusted to nozzle cooling requirements.

These and other objects, features and advantages of the invention will become more apparent from the following description taken in conjunction with the illustrative embodiment in the accompanying drawings.

DESCRIPTION OF THE DRAWINGS

FIG. 6 is a top view of the aft portion of the flap shown in FIG. 5;

FIG. 7 is a cross section of the flap and seal assembly and the flap liner; and

FIG. 8 is a top view showing the cooling air inlet and outlets located in the convergent flap.

DETAILED DESCRIPTION OF A PREFERRED EMBODIMENT

Figure 1:
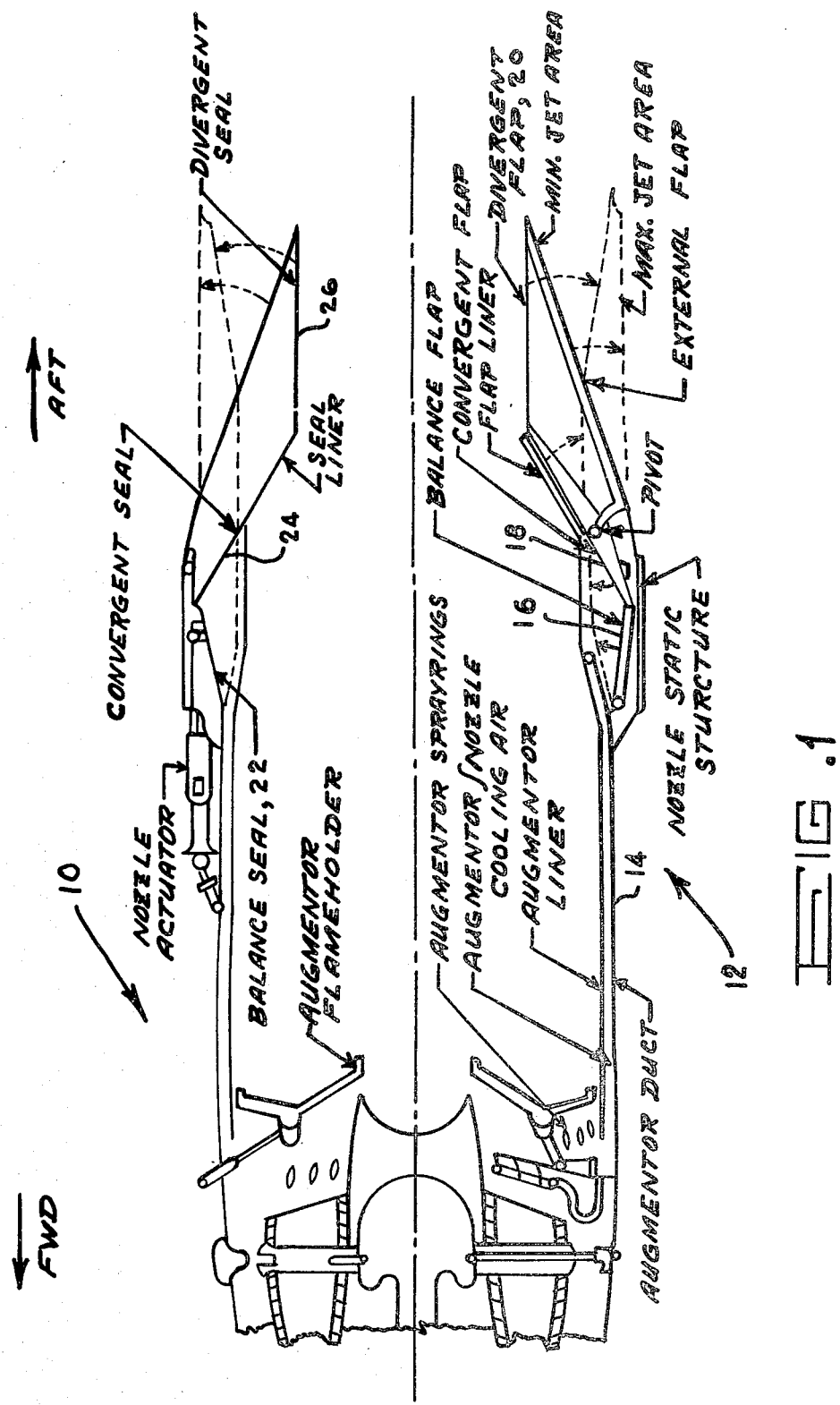
FIG. 1 is a cross-sectioned view of an augmentor/exhaust nozzle for a turbine engine.

Turning now to FIG. 1 there is shown a cross-sectional view of the augmentor/nozzle portion of a turbine engine, such as for example, the F100 engine which is manufactured by the Pratt and Whitney Aircraft Group, East Hartford, Conn. There is shown generally in the forward portion the augmentor section 10 of the engine. The aft section of the engine contains the exhaust nozzle section 12 with its associated mechanisms and members. The present exhaust nozzle cooling apparatus operates in the range of the exhaust nozzle's operational modes, from fully augmented to unaugmented. The cross-sectional view of the exhaust nozzle as shown by the solid outline represents the unaugmented mode wherein a minimum jet area is provided. The displacement of the exhaust nozzle members, as indicated by the respective dashed arrows, to the dashed outlined position, is the maximum jet area which occurs during the augmented mode. The exhaust nozzle comprises respectively alternating strings of flaps and seals circumferentially disposed about the augmentor duct 14. The flap string comprises a balance flap 16, a convergence flap 18, and a divergent flap 20 which are respectively hinged to permit relative motion therebetween in order to achieve the indicated jet areas. The seal string respectively comprises a balance seal 22, a convergence seal 24 and a divergent seal 26. One of the plurality of nozzle actuators which are circumferentially disposed about the augmentor duct 14 is shown. The nozzle actuators are utilized to position the exhaust nozzle with the limits indicated.

Figure 2:
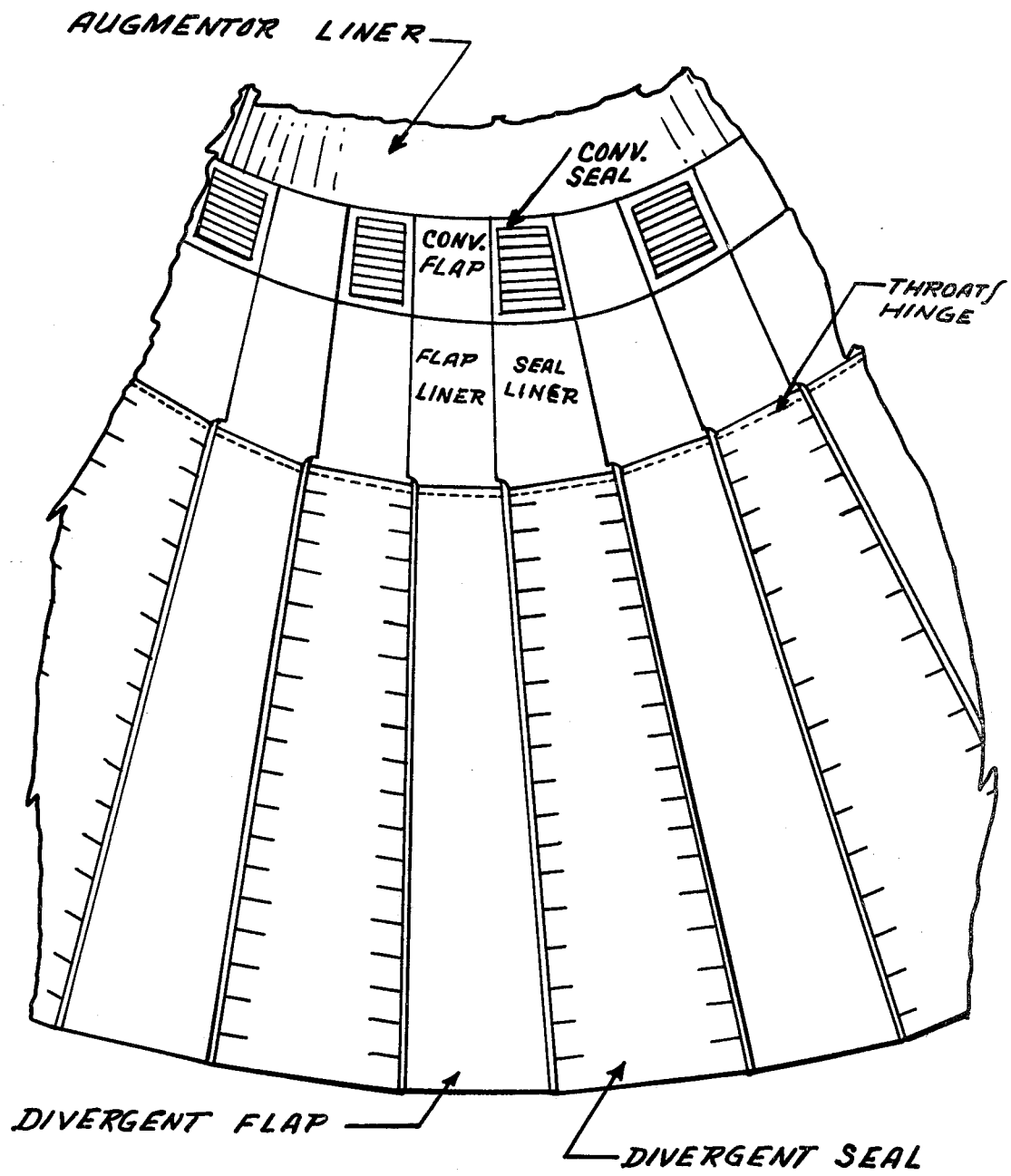
FIG. 2 is a pictorial view of an internal portion of the exhaust nozzle.

There is shown in FIG. 2 an internal pictorial view of the exhaust nozzle showing the relationships between the respective flap and seal strings. It may be noticed the strings of flaps and seals are alternately disposed about the augmentor duct opening (shown in the present example with the augmentor lining removed.). It may also be noticed that as the exhaust nozzle is made larger or smaller as indicated in FIG. 1 by the maximum and minimum jet area, that the seals, respectively, cover and uncover their associated flap. Thus, in the non-augmented mode, a view into the exhaust nozzle would reveal mostly seals in the divergent portion of the nozzle. A synchronizer ring (not shown) which is positioned about the outside of the seals and flaps, maintains the relative contact of the flaps and seals to each, as they are moved to either open or close the nozzle jet area. The hinge and throat area is represented by the dashed lines between the convergent and divergent portions of the exhaust nozzle. Thus, it should be clearly understood that as the exhaust nozzle is closed to provide minimum jet area, the divergent seals slide across the divergent flap in the divergent portion and the convergent flap and flap liner slides across the convergent seal and seal liner in the convergent portion of the exhaust nozzle to respectively stop down the exhaust nozzle area. For a full and complete discussion of the exhaust nozzle operation, reference is made to U.S. Patent, Ser. No. 3,792,815, entitled, "Balance Flap Convergent/Divergent Nozzle", issued Feb. 19, 1974 to C. E. Swavely and R. E. Teagle.

Figure 3:
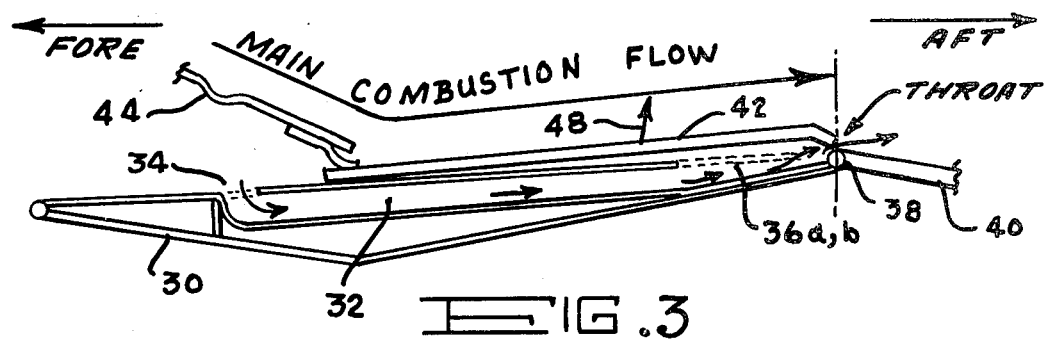
FIG. 3 is a side elevation view of a convergent flap being operated in the augmented mode.

FIG. 3 is a sectional view of one of the convergent flaps from an exhaust nozzle in a turbofan engine during operation in the augmented mode. In this mode, the exhaust nozzle may be opened to its maximum jet area. During operation in this mode the need for additional cooling air is extremely high. The convergent flap 30 contains a cooling passage 32 which has an inlet opening 34 in the forward portion of the flap and outlet opening 36 (indicated by the dashed lines) in the aft portion of the flap. The convergent flap 30 is connected to a hinge assembly 38 which joins the divergent flap 40 to the convergent flap 30. The flap liner 42 is attached to the top of the convergent flap 30 by the usual known suitable means available in the present art. The augmentor liner 44 is shown attached to the forward end of the flap liner 42. The aft end of the flap liner 42 forms the cooling apparatus nozzle throat at the hinge 38. In the present illustration, the exhaust nozzle is operating in the augmented mode wherein the cooling air inlet 34 and the outlets 36a, b are uncovered and the throat is opened to allow cooling air under the augmentor liner 44 to pass through the cooling passage 32 and out the throat. When in the augmented mode, pressure from moving air shown by the arrows forces the flap liner 42 outwardly towards the center line of the engine as shown by arrow 48, allowing cooling air to discharge past the hinge assembly 38 into the divergent flap 40 region of the exhaust nozzle and thereby out of the engine. The main combustion flow is shown passing over the augmentor liner 44 and the flap liner 42 in the normal manner.

Figure 4:
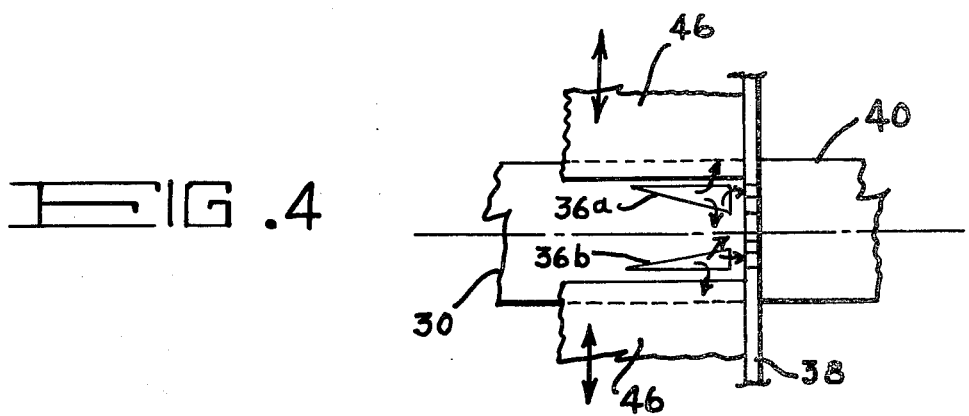
FIG. 4 is a top view of the aft portion of the flap shown in FIG. 1.

There is shown in FIG. 4 a top view of the convergent flap 30 of FIG. 3 wherein the convergent seals 46 which are slideably mounted on the hinge 38, have uncovered the outlet openings 36a, 36b. In the augmented mode, the convergent seals 46 automatically slide as the nozzle throat area changes. Since nozzle throat area increases as the degree of augmentation increases, the triangular opening 36a, 36b are uncovered proportionally to the degree of augmentation, such that cooling flow area and thus cooling flow will change directly with nozzle throat area. It should be noted, however, that these openings may be any shape required to supply the cooling air demanded for a given nozzle throat.

Figure 5:
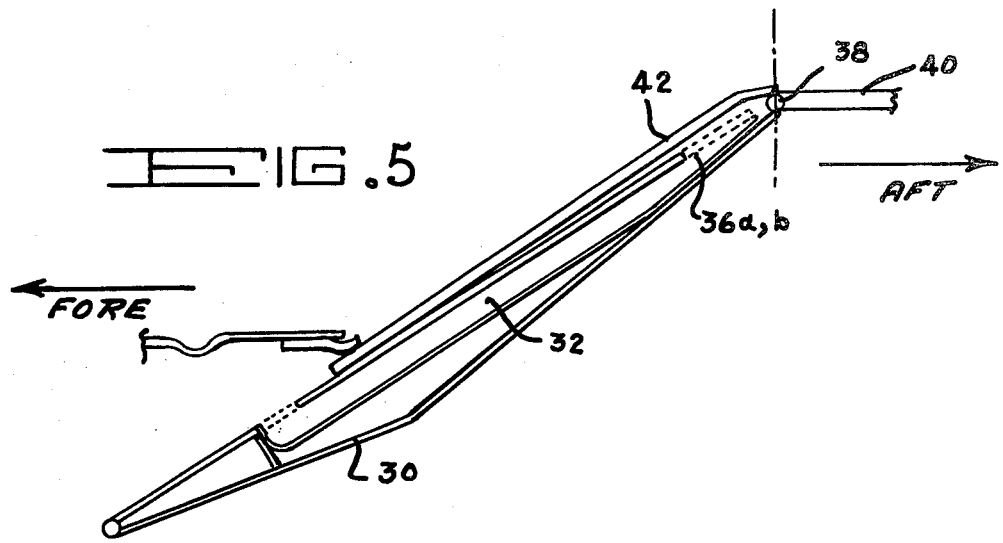
FIG. 5 is a side elevation view of a convergent flap being operated in the nonaugmented mode.

There is shown in FIGS. 5 and 6 the convergent flap 30 and convergent seals 46 in the nonaugmented mode, which are but a few of the plurality of such items circumferentially disposed about the exhaust nozzle as earlier described. As may be seen in FIG. 5, the flap liner 42 is in the closed position and as may be seen clearly in FIG. 6 the convergent seals 46 have covered the cooling air outlets 36a, 36b. When the jet engine is in the unaugmented mode, the convergent seals cover the openings in the convergent flap such that the flow is shut off, thus the pressure under the curtain liner (which is positive during augmentation) becomes negative and thus forces the curtain liner away from the center line of the engine.

There is shown in FIG. 7 a cross-sectional view convergent flap and seals in the augmented mode. FIG. 7 also illustrates the relationship of the seal liners 50 to the flap liner 42. In FIG. 8, there is shown a top view of the relationship of the inlet 34 and outlet 36a, b openings in the convergent flap 30 during the unaugmented mode. A major advantage of this invention is to allow cooling air to be adjusted or fine tuned to meet the cooling requirements of the nozzle such that during nonaugmented operation a performance gain can be realized. The fine tuning feature also allows a performance increase during partial augmented operation.

Although the invention has been described with reference to a particular embodiment, it will be understood to those skilled in the art that the invention is capable of a variety of alternative embodiments within the spirit and scope of the appended claims.

What is claimed is:

1. In a jet engine exhaust nozzle, a cooling apparatus comprising in combination:
   a. a plurality of flap strings moveable attached to said exhaust nozzle,
   a plurality of seal strings moveable attached to said exhaust nozzle, said plurality of seal strings slideably engaging and covering said plurality of flap strings, each seal string being alternately positioned between and on a flap string of said plurality of flap strings, said plurality of flap strings and seal strings being circumferentially disposed about the aft end of said exhaust nozzle to form a controllable convergent/divergent exhaust nozzle, each of said plurality of flap strings in the convergent portion of said convergent/divergent exhaust nozzle having a cooling passage therein, said cooling passage having an inlet opening and a pair of outlet openings, said inlet opening being in the forward portion of said convergent portion and said pair of outlet openings being in the aft portion of said convergent portion, and,
   means for controlling said plurality of seal and flap strings, said control means respectively converging and diverging said plurality of seal and flap strings to close said exhaust nozzle to a minimum jet area and to open said exhaust nozzle to a maximum jet area, said plurality of seal strings closing said outlet openings when said exhaust nozzle is closed to minimum jet area, said plurality of seal strings uncovering fully said outlet openings when said exhaust nozzle is opened to maximum jet area, said inlet opening receiving a cooling medium, said cooling medium flowing through said cooling passageway to said outlet openings, said cooling medium flowing out of said outlet openings in proportion to the opening size thereof.

2. A cooling apparatus as described in claim 1 wherein each of said plurality of flap strings comprise in combination:
   a balance flap moveably attached to the aft end of said exhaust nozzle,
   a convergent flap pivotly mounted to said exhaust nozzle, the forward end of said convergent flap being moveably attached to the aft end of said balance flap, and, a divergent flap moveably attached to the aft end of said convergent flap, the aft end of said divergent flap being moveably attached to said exhaust nozzle.

3. A cooling apparatus as described in claim 1 wherein the opening exposure of said outlet openings is proportional to the exhaust nozzle opening.

4. A cooling apparatus as described in claim 2 wherein said cooling passage is mounted in said convergent flap.

5. A cooling apparatus as described in claim 2 wherein the flow of said cooling medium is proportional to the opening of said exhaust nozzle.

6. A cooling apparatus as described in claim 2 wherein the flow rate of said cooling medium is automatically adjusted as a function of said exhaust nozzle position.

7. A cooling apparatus as described in claim 6 wherein the flow rate of said cooling medium is a function of the shape of the outlet opening in said convergent flap.

* * * * *